Aug. 22, 1939.  E. F. SARVER  2,170,538
FLUID ACTUATED COUPLER
Filed Oct. 10, 1936    2 Sheets-Sheet 1
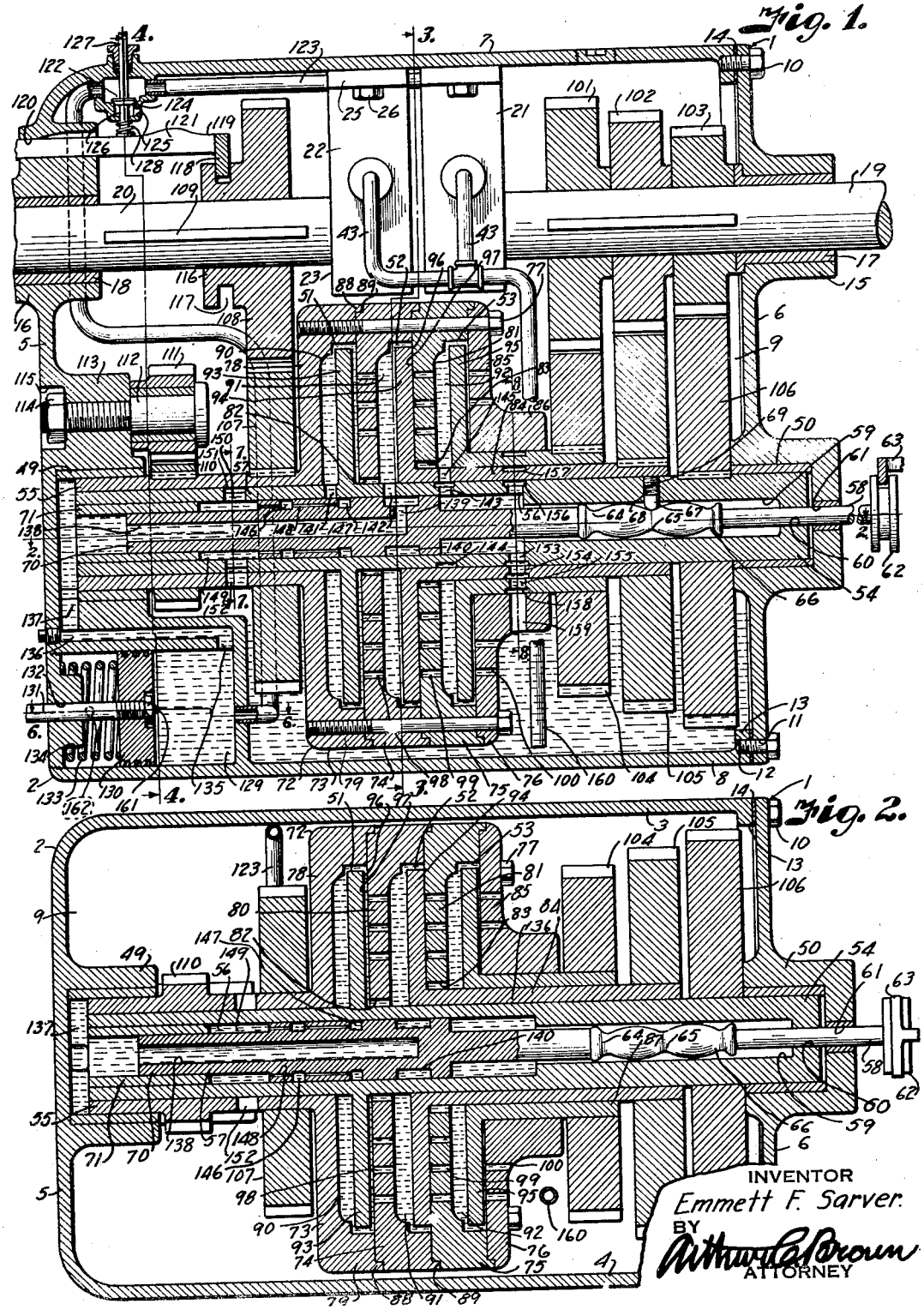
INVENTOR
Emmett F. Sarver.
BY
Arthur E. Brown
ATTORNEY Aug. 22, 1939.    E. F. SARVER    2,170,538
FLUID ACTUATED COUPLER
Filed Oct. 10, 1936    2 Sheets-Sheet 2
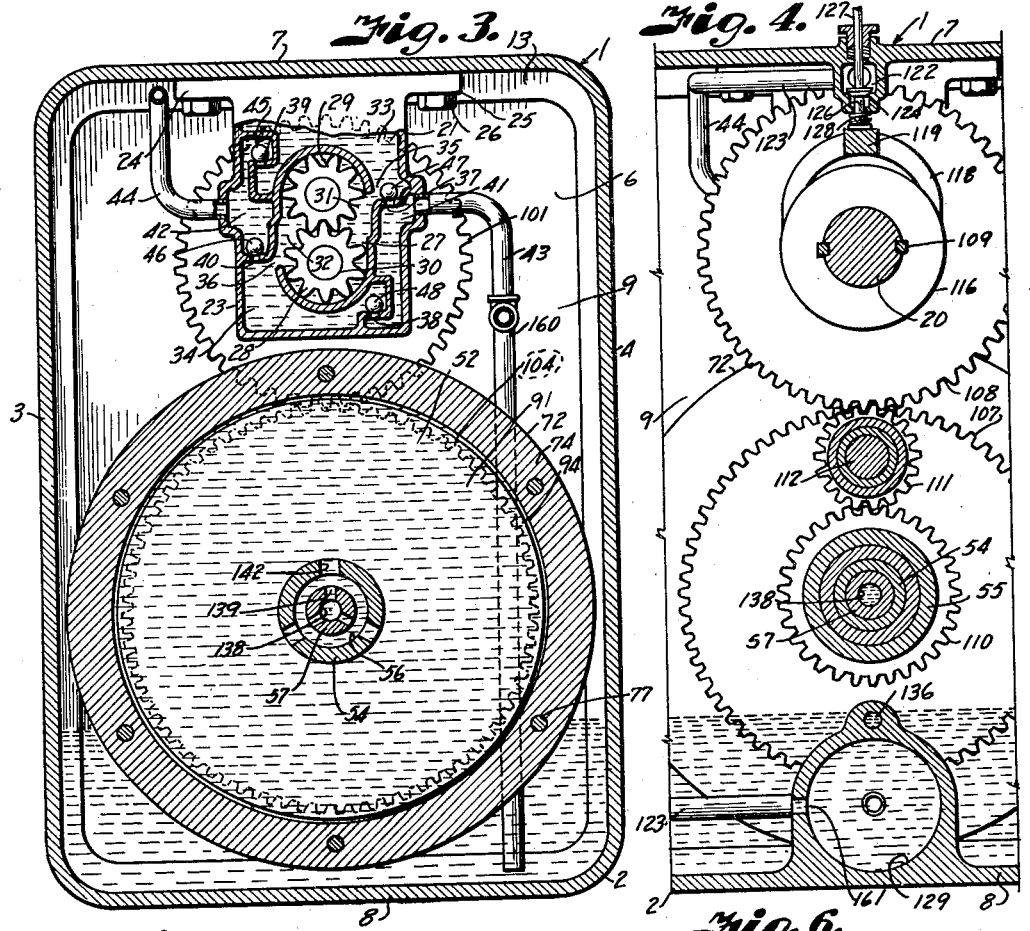
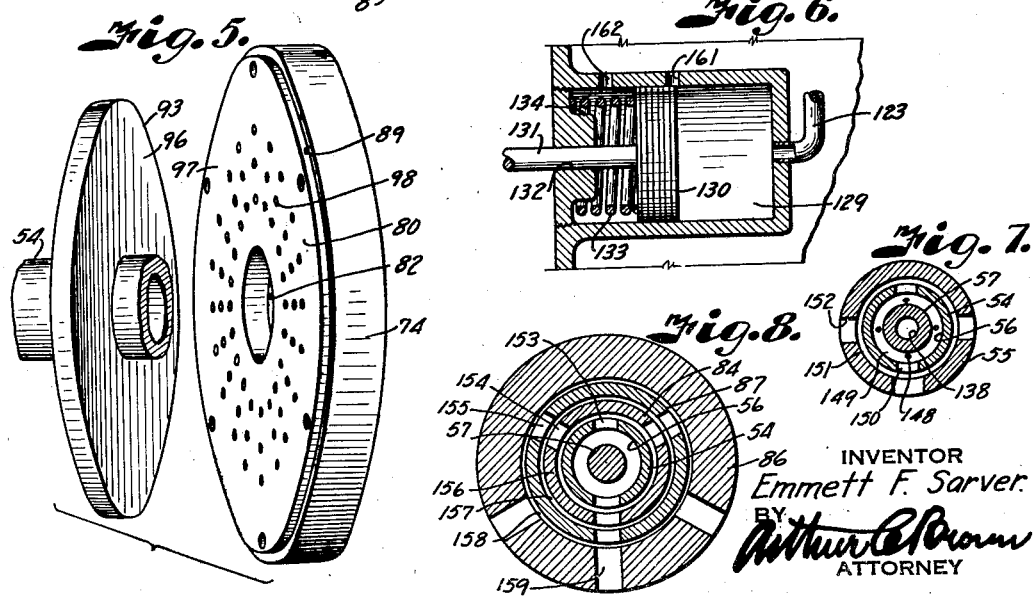
INVENTOR
Emmett F. Sarver.
BY
ATTORNEY Patented Aug. 22, 1939

2,170,538

UNITED STATES PATENT OFFICE 2,170,538

FLUID ACTUATED COUPLER

Emmett F. Sarver, Kansas City, Mo., assignor to Albert L. Freeling, Kansas City, Mo.

Application October 10, 1936, Serial No. 105,018

10 Claims. (Cl. 192—87)

This invention relates to transmission mechanisms and particularly to a fluid actuated intercoupler between a driving and driven member, and has for its principal object to provide a device of this character that may be automatically operated through any one of a plurality of selective speeds.

Other important objects of the invention are to provide an intercoupler whereby the successive speed coupling units are rendered effective with release of a preceding unit; to provide means for maintaining intercoupling engagement incidental to rotation of the driven member as well as the driving member; to provide for maintenance of constant pressure of the fluid medium used in effecting driving engagement; and to provide a coupler that may be utilized as a clutch between the driving and driven members.

It is also an important object of the present invention to provide a coupler mechanism that is automatically effective upon operation of the driving and driven members in either of their respective directions of rotation.

In accomplishing these and other objects of the invention, as hereinafter pointed out, I have provided improved details of structure, the preferred form of which is illustrated in the accompanying drawings, wherein:

Fig. 1 is a vertical section through a selective speed transmission equipped with coupler units constructed in accordance with the present invention.

Fig. 2 is a horizontal section on the line 2—2 of Fig. 1.

Fig. 3 is a vertical cross-section on the line 3—3 of Fig. 1.

Fig. 4 is a fragmentary cross-section on the line 4—4 of Fig. 1.

Fig. 5 is a perspective view of the driving and driven coupling members of a speed coupling unit.

Fig. 6 is a detail section through the compensating means for maintaining constant pressure of the fluid medium.

Fig. 7 is a detail section through the valve for controlling flow of the fluid medium.

Fig. 8 is a cross-section through the valve and part of the rotor constituting one of the coupling members.

Referring more in detail to the drawings:

1 designates my invention embodied in a selective speed transmission such as employed for automotive use and includes a casing 2 comprising side and end walls 3—4 and 5—6 connected by upper and lower walls 7 and 8 to form a fluid-tight chamber 9 housing the intercoupling mechanism and for containing the fluid pressure medium whereby the respective speed coupling units are rendered effective as later described.

In the illustrated instance, the end wall 5, side walls 3—4 and the top and bottom walls 7 and 8 are formed as an integral part to which the end wall 6 is removably secured by fastening devices, such as cap screws 10, having their shanks projected through openings 11 in the end wall and into threaded sockets 12 formed in a flange 13 extending circumferentially within the casing, a gasket 14 being inserted between the flange and end wall to enhance fluid-tightness of the joint.

Carried by the end walls 5 and 6 at the upper central part of the casing are bearing bosses 15 and 16 provided with bushings 17 and 18 in which are rotatably mounted driving and driven shafts 19 and 20 respectively. The shafts 19 and 20 project within the chamber 9 and are connected with fluid pressure pumps 21 and 22 respectively. The pumps 21 and 22 may be of identical construction, each comprising a housing 23 having lateral flanges 24 and 25 at their upper ends for attachment to the upper wall 7 by suitable fastening devices, such as cap screws 26.

Formed in the housings are pump chambers 27 in which are rotatably mounted intermeshing driving and driven gears 28 and 29, the driving gear 28 of each pump being keyed to reduced ends 30 of the driving and driven shafts respectively. The chambers 27 conform to the size of the gears and provide intake and discharge chambers 31 and 32 communicating with manifold chambers 33 and 34 through ports 35 and 36. The manifold chambers are in turn respectively connected through ports 37—38 and 39—40 with inlet and outlet passageways 41 and 42 having connection with suction and discharge lines 43 and 44, later described. The ports 39 and 40, which communicate with the outlet passageway 42, are provided with ball valves 45 and 46 seating on the passageway side of the ports to maintain pump pressure within the line 44. The ports 37 and 38 are closed by similar ball valves 47 and 48 on the manifold sides to prevent back flow through the suction line 43.

Rotatably mounted in suitable bearings 49 and 50 carried by the end walls 5 and 6 at a point below the bearings 15 and 16 is a shaft assembly carrying the speed intercoupling units 51, 52 and 53, now to be described. The shaft assembly includes an inner shaft 54 having one end directly mounted for rotation in the bearing 50 and its opposite end rotatably supported in a quill shaft 55 that is itself directly mounted for rotation in the bearing 49 and upon the shaft 54. Attention is directed to the fact that the quill shaft has slight movement on the shaft 54. The shaft 54 has an axial valve chamber 56 supporting a slide valve 57 that is operated by a stem 58 reciprocable within a reduced bore 59 located in the end of the shaft that is mounted in the bearing 50, the stem of the valve extending through an opening 60 in the closed end of the shaft and through an aligning opening 61 of the bearing to carry an annularly grooved head 62 for connecting an actuating yoke 63 whereby the valve may be manually reciprocated within the valve chamber.

The stem 58 of the valve has annular grooved portions 64, 65 and 66 adapted for engagement by a spring pressed plunger 67 mounted within a radial bore formed in the shaft 54. The plunger is urged into engagement with the stem by a coil spring 68 having one end bearing against the latch and the other end against a plug 69 closing the outer end of the lateral bore. The opposite end of the valve is provided with a reduced tubular pilot portion 70 slidably mounted within a bushing 71 closing the outer end of the valve chamber.

Fixed to the inner end of the quill shaft 55 is a rotor 72 consisting of abutting sections 73, 74, 75 and 76 secured together by bolts 77 extending through aligning openings in the sections 73, 74 and 75 and into threaded openings in the section 73 as best shown in Fig. 1. The section 73 includes a disk portion 78 formed integrally with the quill shaft 55 and has a lateral, peripheral flange portion 79. The sections 74 and 75 include ring-like diaphragms 80 and 81 having axial openings 82 and 83 for accommodating the shaft 54 and a quill shaft 84 respectively. The sections 74 and 75 also have laterally extending peripheral flanges corresponding to the flange portion 79 of the end section 73. The section 76 includes an annular disk portion 85 having a hub 86 rotatably mounted upon a quill shaft 87. The sections are preferably provided with interfitting annular ribs 88 and grooves 89 to enhance the seal between the sections. The housing sections thus form pressure chambers 90, 91 and 92 in which are rotatably mounted coupling members 93, 94 and 95 respectively. The quill shafts 55 and 84 have rotatable bearing upon the shaft 54 and the quill shaft 87 has rotatable bearing upon the quill shaft 84.

The coupling members 93, 94 and 95, in the illustrated instance, consist of flat disks projecting radially from the shaft 54 and quill shafts 84 and 87 respectively to cooperate with the diaphragm portions 80 and 81 and the disk portion 85 of the section 76, which form complementary driven coupling members engageable by the disk-like driving coupling members as later described. The shaft 54 and quill shafts 84 and 87 have slight relative movement in a longitudinal direction so that the contacting faces 96 and 97 of the respective coupling members may be moved into and out of driving relation responsive to application of pressure medium in the respective chambers. The diaphragm sections, as well as the end section 76 of the rotor have a plurality of apertures 98, 99 and 100 respectively connecting the chambers 90 and 91, 91 and 92, and the chamber 92 with the interior of the casing for flow of pressure medium therethrough as later described.

Fixed to the drive shaft 19 are differentially sized gears 101, 102 and 103, meshing with gears 104, 105 and 106 fixed to the quill shafts 87 and 84 and the shaft 54 respectively so that rotation of the drive shaft will effect driving rotation of the coupling members 93, 94 and 95 at differential speeds within their respective chambers 90, 91 and 92.

The quill shaft 55 constitutes the power take-off shaft and connected thereto is a gear 107 meshing with a gear 108 that is slidably keyed on the driven shaft 20 by a spline 109. Also fixed on the quill shaft 55 in spaced relation with the gear 107 is a gear 110 adapted to be meshed with the gear 108, through a reverse gear 111, when the gear 108 is slid from engagement with the gear 107 and across the neutral space between the gears 107 and 111. It is thus obvious that when the rotor 72 is rotated with the gear 108 meshing with the gear 107, the driven shaft 20 will be rotated in one direction and when the gear 108 is moved into engagement with the gear 111, the driven shaft will be rotated in reverse direction incidental to the intermediate gear.

The gear 111 is rotatably mounted on a stub shaft 112 having a threaded shank mounted in a threaded opening of a boss 113 forming a part of the casing 2, the shank being locked against rotation by a lock nut 114 engageable in the bottom of a recess 115 formed on the outer side of the casing. The driven gear 108 is provided with a hub 116 having a groove 117 and engageable in the groove is a yoke 118 having a rod 119 reciprocably mounted in an opening 120 of the casing 2. The rod 119 has a cam portion 121 adapted to open a pressure release valve 122 when the gear is being moved into reverse position. The pressure relief valve is located in a pipe 123 that connects the lines 44 which lead from the discharge side of the pumps 21 and 22, and includes a valve chamber having a seat normally closed by a valve head 124 and which when unseated bleeds the lines 44 through a port 125, thereby relieving pressure on the coupling that happens to be effective in driving the rotor member. The valve includes a stem having a portion 126 that is contacted by the cam 121 and a portion 127 that extends through the casing for manual unseating of the valve. The valve is normally retained in seated position by a spring 128 seating against a foot of the stem portion 126. The pipe 123 connects with a compensating chamber 129 formed within the casing and which contains a displacement member such as a piston 130. The piston 130 carries a rod 131 projecting through an opening 132 in the casing. The piston 130 is moved toward the inlet end of the chamber and against pressure medium contained therein by a spring 133 having one end bearing against the piston and its opposite end encircling a boss 134 on the casing as clearly shown in Fig. 1. The cylinder has an outlet port 135 communicating through a channel 136 with a space 137 formed at the valve end of the shaft assembly and through which pressure fluid is discharged into an axial bore 138 formed in the valve 57.

The bore has a lateral outlet 139 which communicates with an annular groove 140 in the valve, the groove 140 being selectively positioned relatively to radial ports 141, 142 and 143 provided in the shaft 54 and communicating with the respective chambers 90, 91 and 92. The port 143 communicates with an annular groove 144 formed in the periphery of the shaft 54 to connect radial ports 145 in the quill shaft 84 which in turn communicate with the chamber 92.

Formed in the periphery of the valve are annular grooves 146 and 147 spaced apart and from the annular groove 140 in conformity with the spacing of the ports leading to the respective chambers. The annular grooves 146 and 147 are connected through ports 148 with an annular space 149 that is provided about the pilot end of the valve and which communicates through ports 150 with an annular passage 151 formed about the periphery of the shaft 54, the passageway 151 communicating with lateral ports 152 through which liquid flows into the casing for collection in the bottom portion thereof.

Also formed in the shaft at the inner end of the valve chamber are ports 153 to connect with ports 154 and 155 in the quills 84 and 87, the ports being kept in open communication through annular passageways 156, 157 and 158 formed in the shaft 54 and quills 84 and 87 respectively. The final outlet for the passageway in the quill 87 is through lateral ports 159 formed in the hub 86 previously mentioned. The inlet lines 43 of the pumps are interconnected with a common suction line 160 leading to the bottom of the casing and through which the pressure medium is drawn by the pumps for discharge into the compensating chamber 129 and through the compensating chamber to the valve 57 for selective discharge to any one of the respective chambers.

In operating a speed transmission coupler constructed and assembled as described, the power shaft 19 is connected to a suitable prime mover and the driven shaft 20 to the load. Rotation of the driving shaft causes rotation of all the coupling members, 93, 94 and 95, through the meshing engagement of the gears 101, 102 and 103 with the gears 104, 105 and 106 respectively. Rotation of the driving shaft also operates the pump 21. However, the rotor 72 is kept in idle position by opening the valve 122 through manipulation of the rod 127.

Assuming that the driving shaft is rotating in a clockwise direction (Fig. 3), the fluid medium is drawn through the suction line 160 and line 43 of the pump 21 to unseat the valve 47 for flow through the port 35 into the inlet chamber 31. The fluid medium will then be pumped incidental to rotation of the gears 28 and 29 into the outlet chamber for discharge into the manifold chamber 34, building up a pressure therein which retains the valve 48 on its seat and opens the valve 46 so that the compressed fluid flows through the port 40 into the passageway 42 and through the passageway into the pipes 44 and 123, and to the open relief valve where the fluid escapes through the port 125.

In starting the transmission at low speed, the valve rod is moved to the left (Fig. 1) until the plunger 67 engages the groove 66. In this position the annular passageway 140 in the valve registers with the passageway 141 leading to the pressure chamber 90, then upon seating of the valve 124 the pressure fluid from the pump is discharged into the compensating chamber 129 to act against the piston in compressing the spring 133, so that the piston acts as a governor in maintaining substantial constant pressure of the fluid contained in the chamber which flows out through the port 135, channel 136 and into the passageway 137 from where it flows through the bore 138 of the valve to discharge through the port 139 into the passageway 140 and through the passageway to the ports 141, through which the fluid medium flows into the chamber 90 to act against the coupling member 93. Excessive pressure is prevented when the piston has moved sufficiently to uncover a vent port 161 through which the pressure is relieved. Leakage around the piston is discharged through a vent 162 (see Fig. 6).

Since the pressure medium flows into the chamber faster than it can flow through the clearance between the coupling member and the diaphragm 80, the pressure acting on the chamber side of the coupling member will effect lateral shifting of the shaft 54 toward the right to urge the coupling member in driving relation with its complementary driven member or diaphragm 80, and closing flow through the ports 98. Rotation of the coupling member 93 will then cause rotation of the rotor at low speed to drive the driven shaft through the gears 107 and 108 in a forward direction.

Should it be desired to reverse rotation of the driven shaft this may be accomplished by operating the slide bar 119 to move the gear 108 out of engagement with the gear 107. During this movement of the gear 108, the cam portion of the slide bar effects opening of the relief valve to release the pressure acting upon the coupling member 93 to relieve its driving engagement with the diaphragm 80. After the gear 108 has meshed with the reverse gear 111, the cam 121 will have passed the valve stem to allow the spring 128 to close the valve. Pressure will again build up in the chamber 90 to effect driving engagement of the coupling member 93 with the diaphragm coupling member 80. The rotor will then continue to move in the same direction to rotate the quill shaft 55 and the gear 119, but rotation of the gear 108 is reversed incidental to the idle gear 111 so that the driven shaft is rotated in reverse.

Assuming that it is desirable to shift from low speed to intermediate speed instead of into low reverse, the valve rod is shifted to the right (Fig. 1), until the plunger engages in the groove 65. During shifting movement of the valve the annular passageway 147 in the valve registers with the ports 141 leading to the pressure chamber 90 so that the pressure in the chamber is bled through the ports 141, annular passageway 147 and channels 148 into the passageway 149, from where the fluid flows through the ports 150 and 152 back into the sump of the casing 2. During bleeding of the pressure chamber 90, communication of pressure chamber 91 has been established with the pump through communication of the annular passageway 146 in the valve with the port 142 leading to the chamber 91 so that fluid is being discharged into the intermediate rotor chamber; however, since the pressure is being bled from the chamber 90, fluid being discharged into the chamber 91 flows through the ports 98 to act against the contact side of the coupling member 93 to effect its disengagement with the diaphragm 80, thereby positively establishing neutral condition; however, when the plunger 67 is engaged in the groove 65, the annular passageway 147 is moved out of registry with the ports 141 leading to the pressure chamber 90. The pressures are then equalized in the chambers 90 and 91 through the ports 98 and pump pressure is established to cause movement of the coupling member 94 into driving engagement with the diaphragm 81. The gear 105 is then effective in rotating the quill shaft 84 to cause the coupling member 94 to drive the rotor at intermediate speed in a forward direction which drives the driven shaft at intermediate speed either in forward or reverse direction depending upon which of the gears 111 or 107 is engaged by the driven gear 108.

High speed drive is obtained by shifting the valve until the plunger 67 engages in the groove 64. During movement of the valve the ports 142 and 141 will have registered with the annular passages 146 and 147 of the valve so that pressure in the chambers 90 and 91 are bled through the channels 148 and through the ports 150 and 152 into the casing. The annular passageway 140 will also move into registry with the port 143 to discharge fluid into the rotor chamber 92, which pressure acts to help unseat the coupling member 94 to equalize the pressures on the respective sides of all the disks since the chambers 90 and 91 are being bled to the interior of the casing and the fluid admitted to the rotor chamber 92 is free to bleed through the ports 99 and through the chambers 91 and 92 into the casing. However, by the time the groove 64 has been engaged with the plunger the passageways 147 and 146 will have been moved out of registry with the ports 141 and 142, closing off flow of pressure medium from the chambers 90 and 91 to allow the pressure to build up in the chamber 92 which affects lateral shifting of the coupling member 95 into driving engagement with the diaphragm portion of the rotor section 76. The rotor is then actuated at high speed to drive the driven shaft in either forward or reverse direction depending upon engagement of the driven gear 108 with the gears 111 or 107. It is thus obvious that the shift of speeds may be accomplished in successive order, from low through intermediate to high, the mechanism operating so that the pressure medium which effects driving engagement of the coupling member for one speed simultaneously effects positive release of the preceding coupling member so that the valve may be shifted successively through the different speeds without materially interfering with flow of power from the driving to the driven members.

After shifting to high gear, neutral position may be attained by releasing the pressure through the valve 124 so that the pressure exerted in the rotor chamber 92 is insufficient to maintain driving engagement of the coupling member 95 with its complementary coupling 85. When this occurs pressure is also relieved from the chamber through the ports 100. During establishment of pressure in any one of the preceding chambers, pressure is relieved in the succeeding chambers through the valve chamber and ports 155 and 159 into the casing.

In case it should become necessary to effect operation of the driving shaft through the driven shaft as when towing a vehicle to start the motor, the pump 22 is effective in establishing pressure in the same manner as the pump 21. Attention is also directed to the fact that during operation of the driven member by the driving member, the pump 22 is effective in maintaining driving pressures on any one of the respective coupling units. The driving connection is also maintained through the pump 22 in utilizing the braking action of the prime mover and also to maintain pressure in the chamber 129 so that a braking device may be connected with the piston rod 131 to be actuated incidental to building up of the pressure in the compensating chamber. In case the prime mover should be operated in reverse the pumps 21 and 22 are still effective in establishing pressure, however the valves 46 and 47 will remain seated and the flow will be established through the valves 48 and 45, otherwise the operation of the speed coupler is the same as above described.

From the foregoing it is obvious that I have provided a simple speed intercoupler whereby any one of a plurality of speeds may be successively effected or any one of the speeds may be selected simply by operating the slide valve to render the desired coupling units effective in providing a driving coupling between the driving and driven members.

What I claim and desire to secure by Letters Patent is:

1. A driving mechanism including driving and driven members, one of said members having passageways, means supporting said other member for movement to and from covering relation with the passageways, means for applying a fluid pressure medium against the movable member to effect driving contact with said member having the passageways, and means for releasing said fluid pressure and directing said fluid pressure through said passageways to disengage the movable member.

2. In a mechanism of the character described, driving and driven members, one of said members having perforations located in position to be covered by the other member, means supporting said other member for movement from and against the perforated member, means for applying a fluid pressure medium against the movable member to effect driving contact of said members, and means for controlling said fluid pressure medium and for directing said fluid pressure medium through said perforations to shift said movable member from driving contact with the perforated member.

3. In a driving mechanism, pairs of driving and driven members, one of said members in each pair having passageways for flow of fluid pressure medium and adapted to be covered by the other member of the pair, means supporting said other member of each pair for movement into driving relation with the member having said passageways, means for applying fluid pressure medium against the movable member of one pair, and means for selectively diverting the fluid pressure medium against the movable member of the other pair to equalize pressure acting against the first named movable member through said passageways in the other member of the first pair.

4. In a driving mechanism, a rotary member having a fluid pressure chamber and having passageways, a rotary member mounted for independent rotation in said chamber and adapted to be moved into covering relation with said passageways, means for applying fluid medium under pressure against the independently rotatable member to effect driving engagement with the first named rotary member, and means for selectively releasing said pressure medium from the chamber and for directing said pressure medium through said passageways from the side opposite said independently rotatable member to effect equalization of the pressure on the respective sides of said independently rotatable member.

5. In an apparatus of the character described, a casing, a shaft rotatably supported in the casing, a quill shaft mounted for rotation about the axis of the first named shaft, coupling members on said shafts, a housing for said coupling members rotatable about the axis of said shafts, complementary coupling members carried by the housing and having passageways adapted to be covered by the first named coupling members, and means for selectively applying a fluid pressure medium against the first named coupling members to effect driving relation with the complementary coupling members and for applying pressure medium through said passageways of a precedingly engaged coupling member.

6. In an apparatus of the character described, a casing, a shaft rotatably supported in the casing, a quill shaft mounted for rotation about the axis of the first named shaft, coupling members on said shafts, a housing for said coupling members rotatable about the axis of said shafts, complementary coupling members carried by the housing and having passageways covered by the first named coupling members, means for selectively applying a fluid pressure medium against the first named coupling members to effect driving relation with the complementary coupling members including means for applying pressure medium through said passageways of a precedingly engaged coupling member, means for driving said shafts at differential speeds, and a power take-off connected with the housing.

7. In an apparatus of the character described, a rotor including spaced perforated diaphragms forming spaced chambers for containing a fluid pressure medium, a coupling member movably supported in each chamber for movement to and from covering relation with the perforations in said diaphragms, means for rotating said coupling members at different speeds within said chambers, a pump for circulating a fluid medium under pressure to the respective chambers, and valve means controlling flow of said medium to the pressure chambers for selectively urging any one of the coupling members in driving relation with a corresponding diaphragm to actuate the rotor at the speed of the selected coupling member.

8. In an apparatus of the character described, a rotor including spaced perforated diaphragms forming spaced chambers for containing a fluid pressure medium, a coupling member movably supported in each chamber for movement to and from covering relation with the perforations in said diaphragms, means for rotating said coupling members at different speeds within said chambers, a pump for circulating a fluid medium under pressure to the respective chambers, means connecting the pump in driving relation with said coupling members, and valve means controlling flow of said medium to the pressure chambers for selectively urging any one of the coupling members in driving relation with a corresponding diaphragm to actuate the rotor at the speed of the selected coupling member.

9. In an apparatus of the character described, a rotor including spaced perforated diaphragms forming spaced chambers for containing a fluid pressure medium, a coupling member movably supported in each chamber for movement to and from covering relation with the perforations in said diaphragms, means for rotating said coupling members at different speeds within said chambers, a pump for circulating a fluid medium under pressure to the respective chambers, means connecting the pump in driving relation with said coupling members, a power take-off connected with the rotor, a pump connected with the power take-off and having connection with said first named pump for supplying said fluid medium when the first named pump is ineffective, and valve means controlling flow of said medium to the pressure chambers for selectively urging any one of the coupling members in driving relation with a corresponding diaphragm to actuate the rotor at the speed of the selected coupling member.

10. In an apparatus of the character described, a rotor including spaced perforated diaphragms forming spaced chambers for containing a fluid pressure medium, a coupling member movably supported in each chamber for movement to and from covering relation with the perforations in said diaphragms, means for rotating said coupling members at different speeds within said chambers, a pump for circulating a fluid medium under pressure to the respective chambers, valve means controlling flow of said medium to the pressure chambers for selectively urging any one of the coupling members in driving relation with a corresponding diaphragm to actuate the rotor at the speed of the selected coupling member, and means for maintaining constant pressure on the discharge side of said pump.

EMMETT F. SARVER.